No. 628,730. Patented July 11, 1899.
A. WHITNEY & F. HARRINGTON.
WORK HOLDER FOR LATHE SPINDLES.
(Application filed May 27, 1898.)
(No Model.) 2 Sheets—Sheet 1.
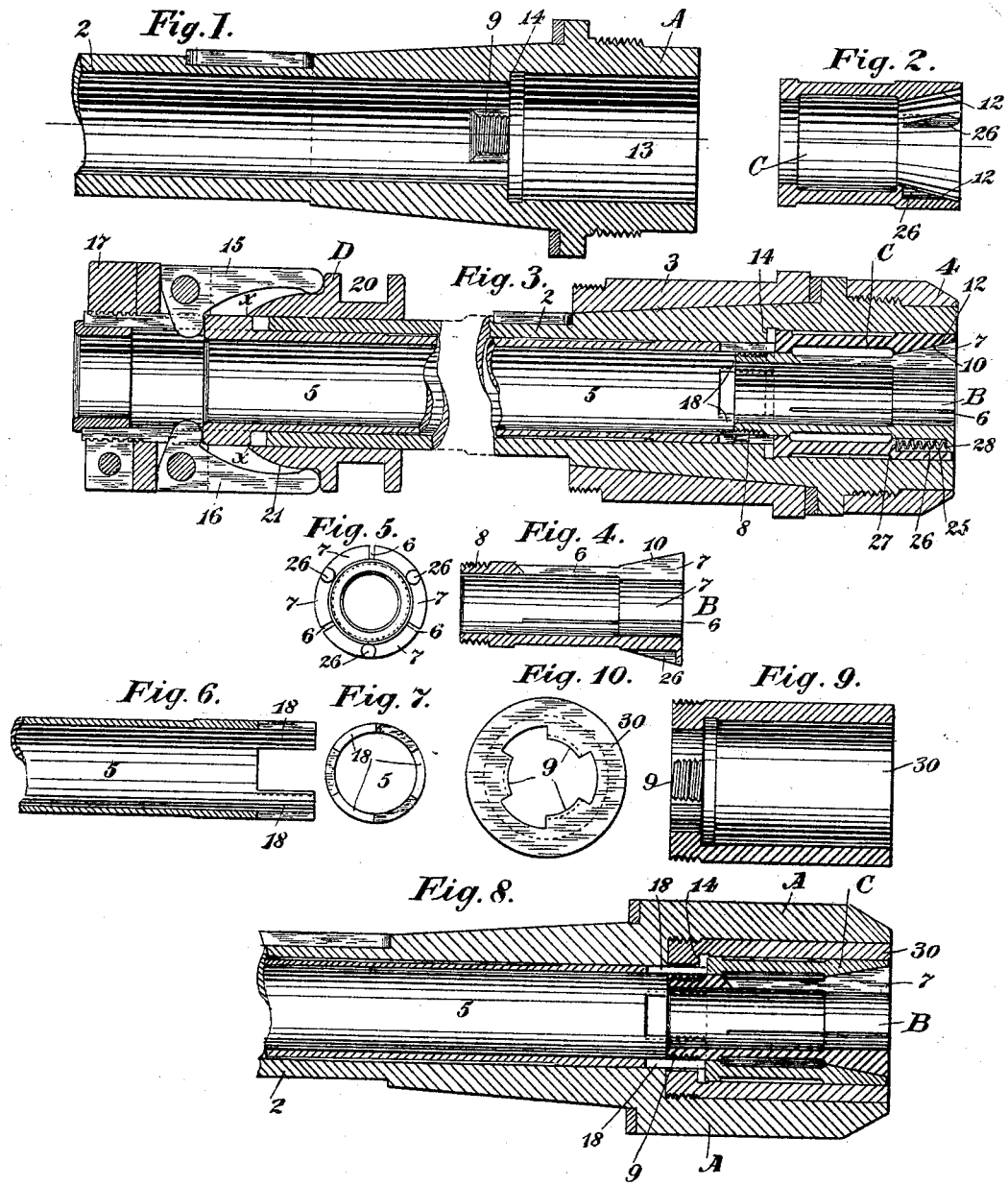
Witnesses
Inventors
Amos Whitney, and
Frank Harrington,
By their Attorney
F. H. Richards.

No. 628,730.  
Patented July 11, 1899.
A. WHITNEY & F. HARRINGTON.
WORK HOLDER FOR LATHE SPINDLES.
(Application filed May 27, 1898.)
(No Model.)  
2 Sheets—Sheet 2.
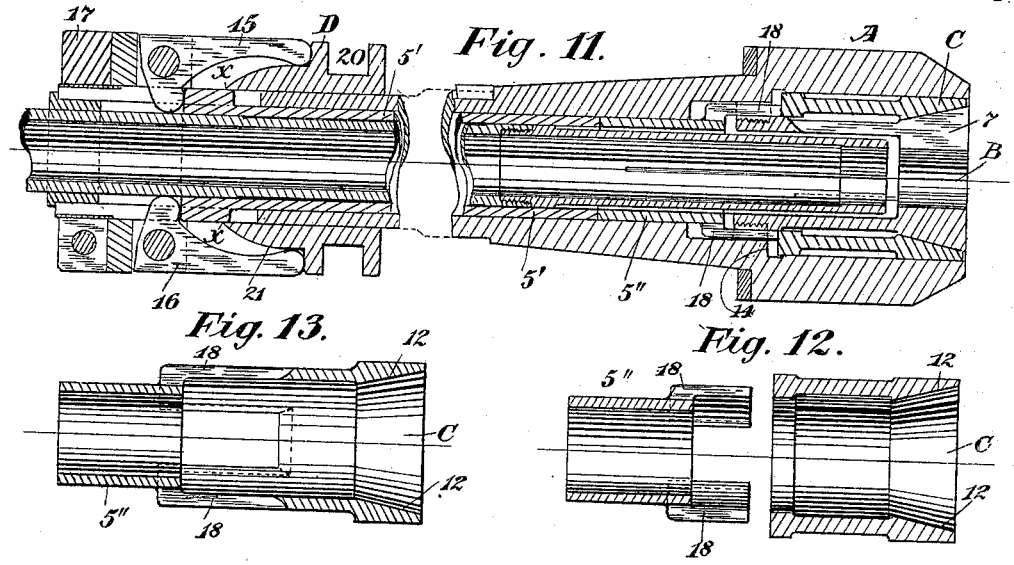
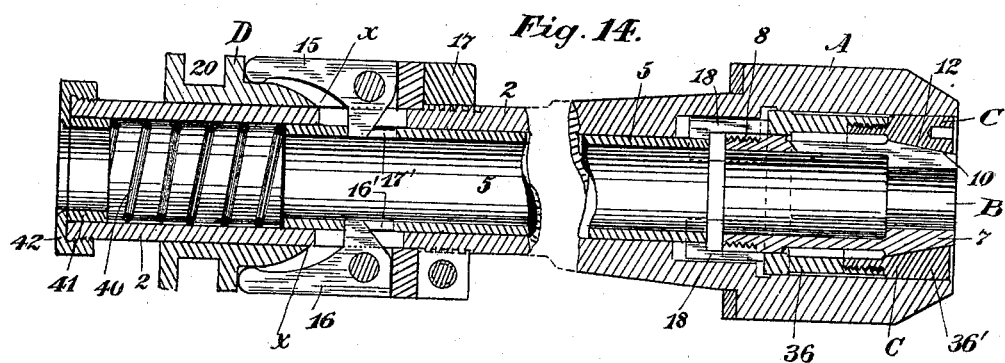
Witnesses  
Chas. F. Schmelz  
Heath Sutherland
Inventors  
Amos Whitney, and  
Frank Harrington,  
By their Attorney  
F. A. Richards.

UNITED STATES PATENT OFFICE.

AMOS WHITNEY AND FRANK HARRINGTON, OF HARTFORD, CONNECTICUT, ASSIGNORS TO THE PRATT & WHITNEY COMPANY, OF SAME PLACE.

WORK-HOLDER FOR LATHE-SPINDLES.

SPECIFICATION forming part of Letters Patent No. 628,730, dated July 11, 1899.

Application filed May 27, 1898. Serial No. 681,879. (No model.)

*To all whom it may concern:*

Be it known that we, AMOS WHITNEY and FRANK HARRINGTON, citizens of the United States, residing at Hartford, in the county of Hartford and State of Connecticut, have invented certain new and useful Improvements in Work-Holders for Lathe-Spindles, of which the following is a specification.

This invention relates to work-holders for lathe-spindles, the object thereof being to provide a simple and efficient device of this character constructed to hold an object firmly against either lateral or longitudinal displacement.

Our improved work-holder involves as one of its essential features means for holding a chuck against endwise movement in the spindle while the jaws thereof are being actuated, the chuck consisting in the present case of the usual collet split longitudinally to form a series of jaws, which are compressed to clamp an object by a sleeve having a beveled or wedge-like interior surface acting against said jaws and which preferably moves longitudinally in the spindle. Other forms of chuck may, however, be employed without departing from our invention. In the present instance the chuck is in threaded engagement with the head of the spindle, and between said chuck and head a longitudinally-reciprocative sleeve having an inclined or wedge-like surface is located, being adapted on its movement in one direction to compress the jaws to clamp an object and on the opposite movement to release said jaws.

In the ordinary form of work-holder involving a split chuck the object to be held is inserted between the jaws of said chuck, which are then operated to clamp the same, and when this action takes place the chuck is caused to move longitudinally of the spindle-head, thereby carrying the work with it and leaving a space between the faces of the head of the spindle and the chuck, the result being that the tendency of the work to chatter or wabble is materially increased. In our improved work-holder the object to be held is also clamped by the contraction of the chuck-jaws, but the chuck being held against movement longitudinally the work, when this is a disk or similar part, can be brought close up to the face of the spindle-head and against the end of the chuck, and it therefore will be firmly clamped while it is being shaped.

In the drawings accompanying and forming part of this specification, Figure 1 is a longitudinal central section of the head and shank of the work-holder. Fig. 2 is a similar view of a chuck-jaw-operating device. Fig. 3 is a longitudinal central section of the complete work-holder, showing one form of the chuck-jaw-operating means and a simple mechanism for operating the tube which controls the action of the jaw-operating member. Fig. 4 is a longitudinal central section of the chuck. Fig. 5 is a front end view of the same. Fig. 6 is a longitudinal central section of the forward end of the tube which actuates the jaw-operating member. Fig. 7 is a front end view of the same. Fig. 8 is a view similar to Fig. 1 and shows a modified form of the device. Figs. 9 and 10 are longitudinal central sectional and face views of a bushing employed in connection with the form of work-holder illustrated in Fig. 8. Fig. 11 is a view corresponding to Fig. 3 and shows another modified form of the device. Fig. 12 is a longitudinal central section of the jaw-operating device shown in Fig. 11. Fig. 13 is a similar view of a modified form of said device; and Fig. 14 is a view similar to Figs. 3 and 11, illustrating another modified form of the work-holder.

Similar characters designate like parts in all the figures of the drawings.

Our improved work-holder, as shown in its preferred form in Figs. 1 to 7, inclusive, involves in its organization a tubular head, as A, in which the chuck and chuck-operating member are disposed, and a tubular shank, as 2, which is usually driven into the internally-tapered sleeve 3, which in turn is fitted in a bearing in a lathe-head, (not shown,) the head A being embraced by a sleeve 4 in threaded engagement therewith, as shown in Fig. 3, and on removing which a universal chuck or other work-holding device may be substituted therefor.

The shank or stem 2 incloses a tube 5, which in the form of work-holder illustrated in certain of the figures of the drawings serves to force forward a device for operating the jaws of the chuck.

The chuck in which the work is held consists in the present case of a longitudinal sleeve or collet split for the greater part of its length to form at one end thereof a series of yielding jaws, by contracting which an object inserted therein may be firmly held, said chuck being positively secured against endwise movement, so that when the jaws are operated to grip the work the latter will be truly centered and held against displacement. The chuck is designated by B and is disposed in the head A, the front faces of both chuck and head being substantially flush, as represented in Fig. 3. The chuck is slitted, as at 6, for the greater part of its length (see Fig. 4) to form a series of contractible jaws 7 and is in screw-threaded engagement with the head A, whereby it is held against longitudinal movement when the jaws are contracted. Said chuck is externally screw-threaded, as at 8, at its inner end, such screw-threaded portion being adapted to engage threaded segments 9 on the interior of the chuck-spindle, as shown in Fig. 1, when the parts are in assembled position. (See Fig. 3.)

From the preceding description it will be evident that the spindle and the chuck are fixed relatively to each other.

For operating the jaws of the chuck a suitable device located between said jaws and the head A is provided, and said device consists in the present case of a sleeve, as C, having an inclined interior surface at its forward end, which is incased in the head A and encircles or surrounds the contractible jaws 7 of the chuck B. The jaws 7 are beveled, as at 10, on their outer faces, the adjacent or inner face of the sleeve C, which is fitted for longitudinal sliding movement in the head A, being correspondingly beveled, as at 12. The seat 13 in the head A, which receives the sleeve C, is slightly longer than said sleeve, so as to permit a limited rearward movement of the latter to permit of the release of the work-holding jaws 7. When the jaws are open, the inner end of the sleeve C is against the shoulder 14, the outer end of said sleeve being a short distance to the left of the outer edge of the head, and it will be evident that when the sleeve is moved forward the beveled face 12 thereof will ride along the coöperating beveled faces 10 of the jaws, so as to compress the latter, the degree of movement of the sleeve governing the amount of compression applied. On the backward movement of the sleeve the jaws will spring outward or resume their initial positions by reason of their elasticity.

While it is evident that the jaw-contracting member or sleeve C may be operated in various ways, we prefer to actuate it by means such as the tube 5, to which reference has hereinbefore been made, which tube is reciprocative in the shank or stem 2. In the form of the device illustrated in Figs. 1 to 5, inclusive, the outer end of the tube 5 engages the adjacent or inner end of the sleeve C, so that when said tube is moved outward the sleeve will be advanced to effect the compression of the jaws 7. The tube 5 is operated in the present case by levers, as 15 and 16, mounted in the usual manner upon diametrically opposite sides thereof, the toes of the levers being adapted to engage the inner end of said tube to force the same forward, as represented in Fig. 3, although it is apparent that the tube may be otherwise operated. The two levers are fulcrumed in this instance upon a collar 17 in screw-threaded engagement with the inner end of the shank 2. The forward end of the tube 5 is cut away to form a series of arms, as 18, which extend through the spaces between the threaded segments 9 on the inside of the head and which bear against the inner end of the jaw-contracting sleeve C and operate the latter.

The levers 15 and 16 for advancing tube 5 are operated by a sliding sleeve D, having a conical end embracing the stem 2, said sleeve having a peripheral groove 20 to receive the end of the usual operating-lever. (Not shown.)

When the jaws 7 are open or in their initial positions, (shown in Figs. 4 and 5,) the levers 15 and 16 will be in contact with the conical surface 21 of sleeve D at about the points $x$, and the act of moving said sleeve rearward throws the long arms of the two levers 15 and 16 outward, so that the toes or short arms of said levers are caused to drive the tube 5 forward, and consequently advance the jaw-operating sleeve C, and on the retraction of the tube this operation will of course be reversed.

To facilitate the unlocking of the jaws 7 for releasing the work, a spring is provided to act against the sleeve C to retract the same, said spring being designated by 25 and fitting in a pocket 26 in the sleeve, its opposite end acting against the shoulders 27 and 28, formed on the sleeve C and chuck B, respectively, as represented in Fig. 3. When the several parts are advanced to the positions shown in this figure, the spring 25 is placed under compression, so that when the parts are released the spring serves to retract the sleeve C and release the jaws 7.

It will be evident from the foregoing that the improved work-holder involves in connection with its spindle and chuck a sleeve longitudinally movable in the spindle and in position for operating the jaws of the chuck, means for advancing the chuck, and means embodying a spring acting in opposition to the sleeve-advancing means, said spring serving instantly to unlock the jaws when the sleeve-advancing means is released.

It will also be apparent from the preceding description that the external threads 8 on the inner end of the chuck B engage the screw-threaded segments 9 on the inside of the spindle-head A and that the arms 18 at the extreme forward end of the tube 5 pass through the spaces between the segments, so that said arms can engage the inner end of the sleeve C for advancing the latter. As is obvious, however, this arrangement may be reversed by forming the threaded segments on the chuck instead of in the head without departing from our invention.

In Figs. 8, 9, and 10 we have illustrated modified means for holding the chuck in the spindle-head A. In these views the chuck B engages the segments 9, which are on the interior of the bushing or sleeve 30, said bushing being in threaded engagement with the interior of the head A, the outer surfaces of the two parts being flush, as clearly indicated in Fig. 8. The sleeve 4 and the spring 25 are dispensed with in this modification, and with these exceptions the two forms thus far described are the same, and corresponding characters are employed to designate like parts in these two as well as the other forms of the device.

In Figs. 11 and 12 another modified form of the device is illustrated, wherein the tube 5 is made in sections, (designated, respectively, by 5' and 5'',) the series of arms 18 on the section 5'' abutting against the sleeve 7, and in other respects the construction illustrated in Fig. 11 is the same as that shown in Fig. 8.

In Fig. 13 the sleeve C and the forward section of the tube 5'' are shown as integral.

In Fig. 14 the sleeve C is shown in two parts 36 and 36', the part 36 being either integral with or connected to the arms 18 on the inner end of the tube 5 and the latter being drawn inward to cause the sleeve to effect the contraction of the jaws 7. In this construction the beveled faces 10 and 12 on the chuck B and sleeve C are disposed in a direction the reverse of that illustrated in the other views, so that when the tube 5 is drawn inward the sleeve C, the two sections of which are detachably joined, will be correspondingly moved. The toes of the two levers 15 and 16 pass through slots 16' and 17', formed in the tube 5 near its inner end, and said tube is normally held in its extreme forward position by the coiled spring 40 bearing against the same and also against the flange 41 of the nut 42 at the inner end of the shank 2, the spring being put under compression when the levers are operated to lock the jaws. When the two levers are released, the spring 40 will act against the tube 5 to force the same outward, thereby retracting the sleeve C to release the jaws.

Having thus described our invention, what we claim, and desire to secure by Letters Patent, is—

1. The combination, with a spindle and a chuck, one of said parts having a series of threaded segments and the other a threaded portion engaging said segments, of means carried by the spindle and adapted to pass between said segments to actuate the chuck.

2. The combination, with a spindle and its chuck, said spindle having a series of threaded segments and the chuck being threaded to engage said segments, of means in the spindle for actuating said chuck, said means passing through the spaces between the segments.

3. The combination, with a spindle and its chuck, said spindle having a series of threaded segments and the chuck being threaded to engage said segments, of a sleeve in the spindle having a beveled surface adapted to engage the chuck; and means passing through the spaces between the segments and adapted to actuate the sleeve.

4. The combination, with a spindle and its chuck, said spindle having threaded segments and the chuck being threaded to engage said segments, of a sleeve in the spindle shaped to actuate the jaws of the chuck; a tube having arms passing through the spaces between said segments; means for positively actuating said tube in one direction to cause it to operate the sleeve; and a spring for forcing the tube and sleeve in the opposite direction.

5. The combination, with a spindle and a chuck, one of said parts having a series of threaded segments and the other a threaded portion engaging said segments, of a sleeve within the spindle having a beveled surface adapted to engage with similar surfaces formed on the chuck-jaws; a tube for actuating said sleeve, said tube being also located within the spindle; levers for actuating said tube; and a cone-shaped sleeve mounted for reciprocation on the spindle and adapted to operate said levers.

6. The combination, with a spindle and its chuck, said spindle having threaded segments and the chuck being threaded to engage said segments, of a sleeve in the spindle adapted to actuate the jaws of the chuck; a tube having arms passing through the spaces between said segments; pivoted levers for actuating said tube; a cone-shaped sleeve for operating said levers; and a spring for actuating the tube in a direction the reverse to that in which it is moved by said levers.

7. The combination, with a spindle and its chuck, said spindle having threaded segments and the chuck being threaded to engage said segments, of a sleeve in the spindle adapted to actuate the jaws of the chuck; a tube having arms passing through the spaces between said segments, said arms connected with said sleeve; pivoted levers for actuating the tube and thereby the sleeve in one direction to compress the chuck-jaws; and a spring for actuating said parts in the opposite direction to release said jaws.

AMOS WHITNEY.
FRANK HARRINGTON.

Witnesses:
R. M. HANNAFORD,
HENRY BISSELL.